United States Patent
Jin et al.

(10) Patent No.: US 10,283,261 B2
(45) Date of Patent: May 7, 2019

(54) POWER CONVERSION DEVICE

(71) Applicant: Delta Electronics, Inc., Taoyuan (TW)

(72) Inventors: Da Jin, Taoyuan (TW); Yahong Xiong, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/051,473

(22) Filed: Jul. 31, 2018

(65) Prior Publication Data

US 2019/0043661 A1    Feb. 7, 2019

(30) Foreign Application Priority Data

Aug. 3, 2017    (CN) .......................... 2017 1 0657656

(51) Int. Cl.
*H02M 3/335*    (2006.01)
*H02J 3/38*    (2006.01)
(Continued)

(52) U.S. Cl.
CPC ............. *H01F 27/346* (2013.01); *H01F 3/00* (2013.01); *H01F 27/2804* (2013.01); *H01F 27/2823* (2013.01); *H01F 27/2876* (2013.01); *H02M 7/515* (2013.01); *H02M 2001/0048* (2013.01); *H02M 2001/0064* (2013.01)

(58) Field of Classification Search
CPC .................. H01F 27/34; H01F 27/346; H02M 2001/0048; H02M 2001/0064; H02M 7/523; H02M 3/285; H02M 3/33569; H02M 3/33576; H02M 2001/0058; H02M 7/17; H02M 7/23; G05F 1/13
See application file for complete search history.

(56) References Cited

U.S. PATENT DOCUMENTS 3,579,093 A * 5/1971 Johannessen ............ H03H 7/48
                                                    323/328
5,499,056 A * 3/1996 Pugel ...................... H03J 5/244
                                                    348/731

(Continued)

FOREIGN PATENT DOCUMENTS

TW    200702828 A    1/2007
TW    200828768 A    7/2008
TW    M353372 U     3/2009

*Primary Examiner* — Gary L Laxton
(74) *Attorney, Agent, or Firm* — CKC & Partners Co., LLC

(57) ABSTRACT

The present invention relates to a power conversion device, comprising: at least one resonant circuit comprising at least one resonant inductor and at least one resonant capacitor; a first transformer comprising a first primary winding which is electrically connected to the resonant circuit and at least one first secondary winding; and a second transformer comprising a second primary winding which is electrically connected to the resonant circuit and at least one second secondary winding, the second primary winding and the first primary winding are connected in parallel and have the same number of coil turns, and the second secondary winding and the first secondary winding have the same number of coil turns; an deviation of inductance between the first primary winding and the second primary winding meets |Lm1−Lm2|/(Lm1+Lm2)<=30%, Lm1 is the inductance of the first primary winding, and Lm2 is the inductance of the second primary winding.

11 Claims, 14 Drawing Sheets

(51) Int. Cl.
*H01F 27/34* (2006.01)
*H01F 27/28* (2006.01)
*H01F 3/00* (2006.01)
*H02M 7/515* (2007.01)
*H02M 1/00* (2006.01)

(56) References Cited

U.S. PATENT DOCUMENTS 8,374,000 B2 * 2/2013 Liang .................... H02M 3/285
363/131
8,743,575 B2 * 6/2014 Nymand ............... H02M 3/335
363/17

* cited by examiner

POWER CONVERSION DEVICE

CROSS-REFERENCE TO RELATED APPLICATIONS

This non-provisional application claims priority under 35 U.S.C. § 119(a) on Patent Application No. 201710657656.4 filed in P.R. China on Aug. 3, 2017, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to a magnetic component, and particularly relates to a magnetic component which is capable of reducing loss of a magnetic core while reducing parasitic resistance and thermal resistance of windings, and a power conversion device using the magnetic component.

BACKGROUND ART

With improvement of technologies like internet, cloud computing, electric vehicles and industrial automation, consumption of electric power becomes greater, which leads to a greater demand for power source. As such, a power conversion device with high power density and high efficiency must be developed. Meanwhile, under the requirements for high power density and high efficiency, the heat dissipation of the power conversion device is also one of the key points that must be considered.

As regards to the power conversion device, it is an effective means of increasing the power density to improve a switch frequency of the internal switching circuit, because when the switch frequency of the switching circuit rises, a size of the filter may correspondingly decrease linearly. Moreover, with the loss unchanged, if the switch frequency of the switching circuit rises, a product of a variation of a flux density borne on the magnetic component, such as, a transformer, etc., within the power conversion device and a working frequency of the magnetic component may rise substantially. As such, a sectional area and the number of turns of the magnetic component may be reduced correspondingly, which makes a volume of the magnetic component is reduced significantly.

The existing power conversion device often comprises a transformer, of which a primary winding is connected to a switching circuit, when the switching circuit is switched on or off, the primary winding of the transformer transmits a received electric energy to a secondary winding, and the electric energy on the secondary winding may be supplied to a load after rectification by a rectifying circuit and filtering by a filter circuit.

However, when the switch frequency of the switching circuit in the existing power conversion device is improved in order to increase a power density, if the switch frequency of the switching circuit has reached a limit that a single transformer can suffer, structure limitation of the single transformer becomes a bottleneck of increasing the power density. Even further, when the power density of the existing power conversion device has to be increased, width and thickness of PCB windings of the single transformer must be increased correspondingly, and it helps little to efficiency improvement of the power conversion device. When the width of the PCB windings of the transformer is increased to a certain degree, it helps little to reduce the winding resistance. When number of the PCB winding layers of the transformer increases further, not only increase of the costs is unacceptable, but also the thermal resistance of the PCB windings of the power conversion device to the top radiator is increased, such that the existing power conversion device is poor in heat dissipation. As can be known, the focus of current research and development is actually how to enable the power conversion device to maintain the overall efficiency and have better heat dissipation under the circumstance of a high power density.

In addition, the magnetic core of the transformer in the existing power conversion device may actually use a E-core or a U-core. All windings of the E-core are centrally wound on a middle column of the E-core, whereas the windings of the U-core are separately wound around two core columns of the U-core on two sides. So when the windings wound on the U-core are PCB windings, a foot print size of the PCB windings may be reduced. Moreover, the PCB windings on the E-core are mostly covered by the E-core and are not exposed to the air, whereas the PCB windings on the U-core are merely partially covered by the U-core, that is, the PCB windings on the U-core are mostly exposed to the air. So the heat dissipation effect of the windings on the U-core is better. Although there are indeed advantages in using the U-core, if the structure of the U-core can be further improved to further reduce loss of the U-core, efficiency of the power conversion device can be improved.

Further, the existing power conversion device must consider the issue of EMI performance. As such, in order to obtain better EMI performance, EMI filters are added to the existing power conversion device. However, this method increases production costs of the power conversion device at the same time.

Therefore, the most urgent subject to be solved at present is to develop a magnetic component which overcomes the above deficiencies, and is capable of reducing core loss while reducing parasitic resistance and thermal resistance of the windings, and a power conversion device using the magnetic component.

DISCLOSURE OF THE PRESENT INVENTION

One of the objects of the present invention is to provide a magnetic component and an adaptive power conversion device, thereby solving the deficiencies of poor converting efficiency and heat dissipation possessed by the existing power conversion device. Moreover, the magnetic component and the adaptive power conversion device of the present invention further have the advantages of reducing loss of the magnetic core, reducing parasitic resistance and thermal resistance of the windings, and reducing production costs of the power conversion device.

In order to achieve the above object, a generalized implementing pattern of the present invention is to provide a power conversion device, comprising: at least one resonant circuit comprising at least one resonant inductor and at least one resonant capacitor; a first transformer comprising a first primary winding which is electrically connected to the resonant circuit and at least one first secondary winding; and a second transformer comprising a second primary winding which is electrically connected to the resonant circuit and at least one second secondary winding, the second primary winding and the first primary winding are connected in parallel and have the same number of coil turns, and the number of coil turns of the second secondary winding is the same as that of the first secondary winding; wherein an deviation of inductance between the first primary winding and the second primary winding meets $|Lm1-Lm2|/(Lm1+Lm2)<=30\%$, Lm1 is the inductance of the first primary winding, and Lm2 is the inductance of the second primary winding.

EMBODIMENTS

Figure 1:
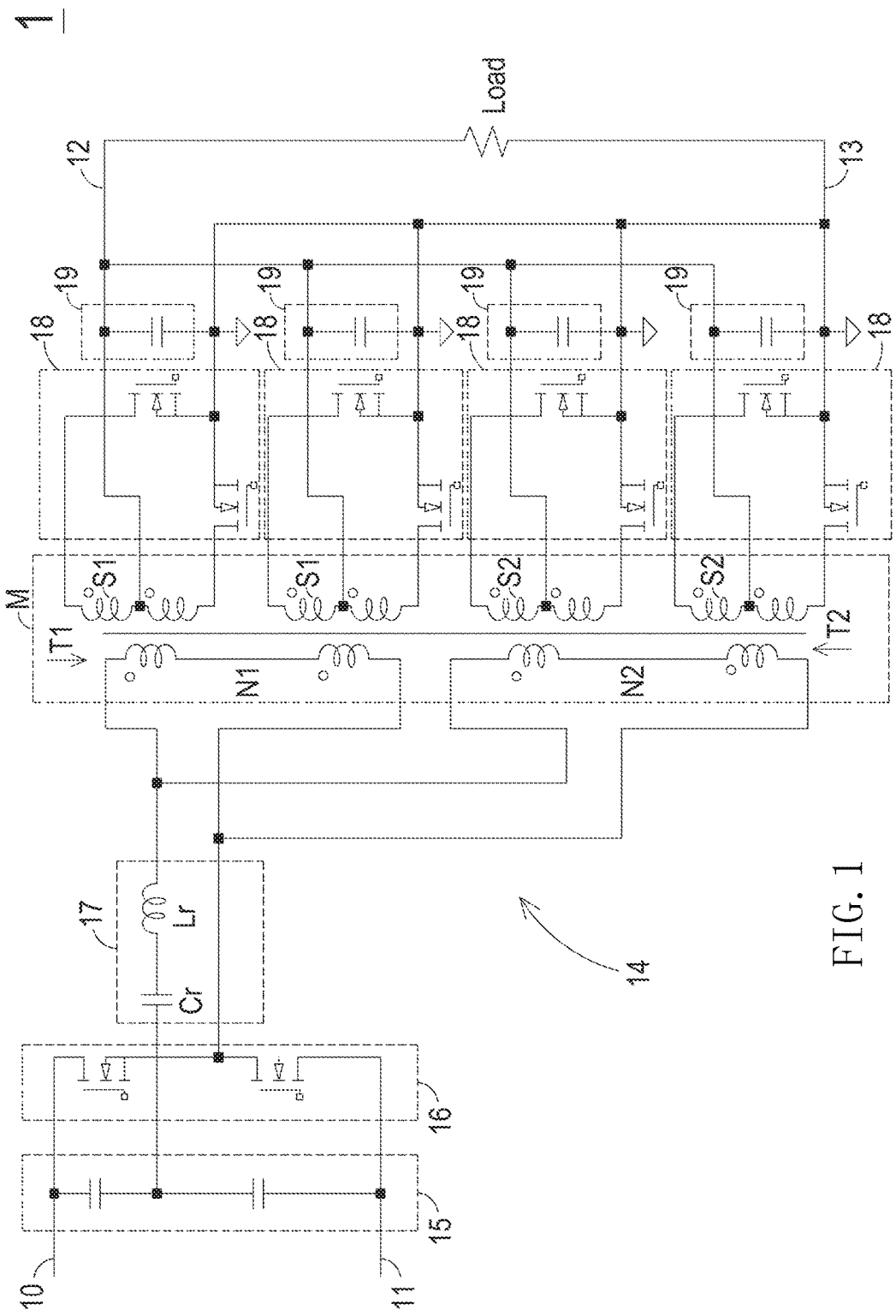
FIG. 1 is a schematic diagram of a circuit structure of a power conversion device in the first preferred embodiment of the present invention.
Figure 2:
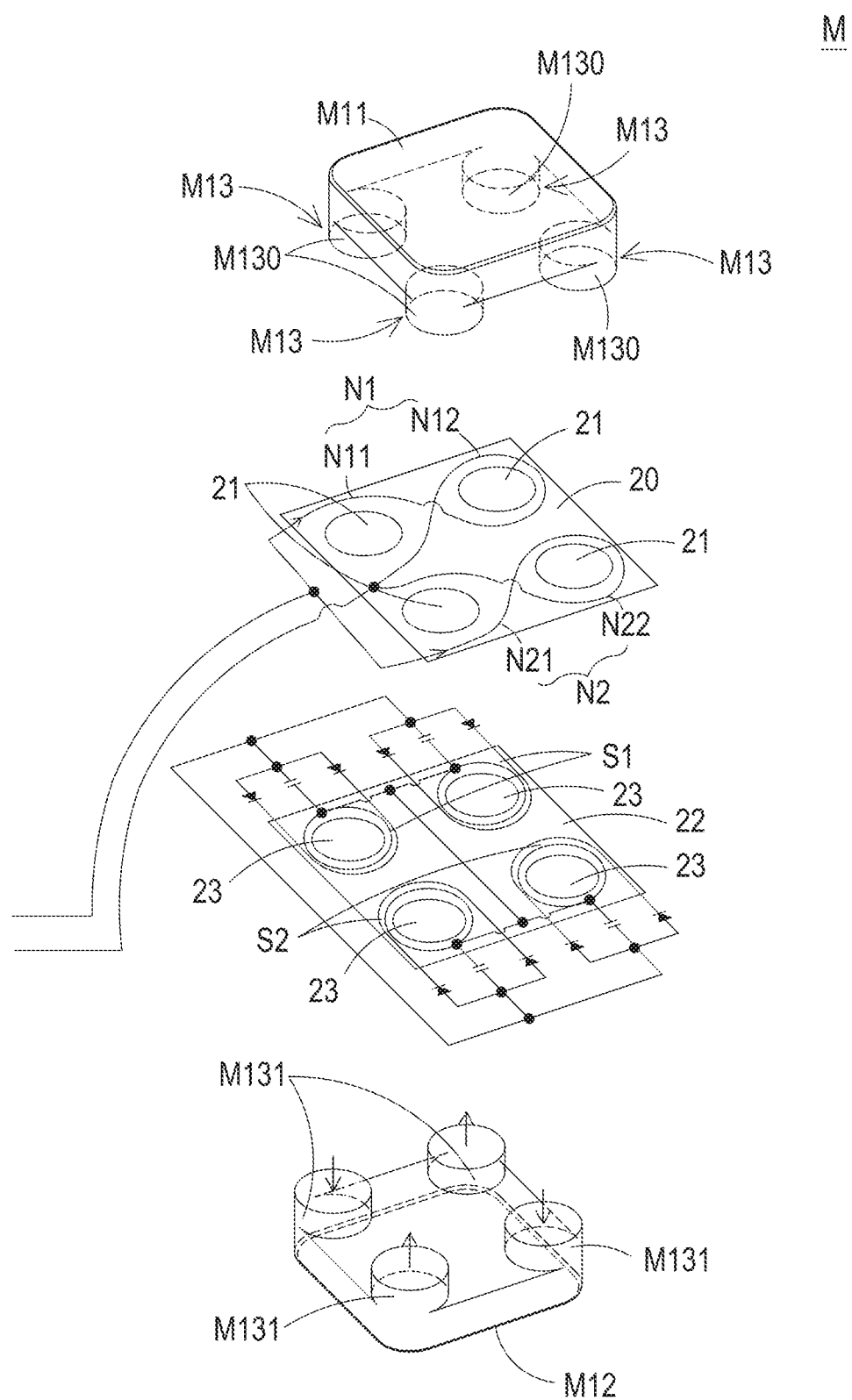
FIG. 2 is a schematic diagram of an exploded structure of the magnetic component shown in FIG. 1.

Please refer to FIGS. 1 and 2, of which FIG. 1 is a schematic diagram of a circuit structure of a power conversion device in the first preferred embodiment of the present invention, and FIG. 2 is a schematic diagram of an exploded structure of the magnetic component shown in FIG. 1. As shown in FIGS. 1 and 2, a power conversion device 1 of the present invention may be, but is not limited to, a resonance type DC/DC converter convert input electric energy into output electric energy for a Load, and comprises a positive input terminal 10, a negative input terminal 11, a positive output terminal 12, a negative output terminal 13 and a converting circuit 14. The power conversion device 1 receives the input electric energy via the positive input terminal 10 and the negative input terminal 11, and outputs the output electric energy via the positive output terminal 12 and the negative output terminal 13 which are electrically connected to the Load.

Input terminals of the converting circuit 14 are electrically connected to the positive input terminal 10 and the negative input terminal 11, respectively, and output terminals of the converting circuit 14 are electrically connected to the positive output terminal 12 and the negative output terminal 13, respectively. The converting circuit 14 converts the input electric energy into the output electric energy, and comprises an input filter circuit 15, an inverter circuit 16, a resonant circuit 17, a magnetic component M consisting of transformers T1 and T2, a plurality of rectifying circuits 18 and a plurality of output filter circuits 19.

The input filter circuit 15 is electrically connected between the positive input terminal 10 and the negative input terminal 11 for filtering the input electric energy. In some embodiments, the input filter circuit 15 may comprise two input capacitors connected in series.

The inverter circuit 16 is electrically connected to output terminals of the input filter circuit 15 for converting the filtered input electric energy into transition AC electric energy. In some embodiments, the inverter circuit 16 may comprise two switch components connected in series to form a half-bridge circuit structure.

The resonant circuit 17 is electrically connected to the output terminal of the input filter circuit 15 and an output terminal of the inverter circuit 16. In some embodiments, the resonant circuit 17 may be formed of a resonant capacitor Cr and a resonant inductor Lr connected in series, wherein the resonant capacitor Cr is electrically connected between the input filter circuit 15 and the resonant inductor Lr, and the resonant inductor Lr is electrically connected between the resonant capacitor Cr and primary sides of the transformers T1 and T2.

The transformer T1 of the magnetic component M has a first primary winding N1 and two first secondary windings S1. Two outlet terminals of the first primary winding N1 are electrically connected to the resonant circuit 17, respectively, and the first primary winding N1 is actually formed of a first coil N11 and a second coil N12 (as shown in FIG. 2) connected in series. But it is not limited thereto, and it may also be formed of the first coil N11 and the second coil N12 connected in parallel. The two first secondary windings S1 are center tap structures, respectively. When receiving the transition AC electric energy transmitted from the inverter circuit 16, the first primary winding N1 of the transformer T1 transmits the transition AC electric energy to the two first secondary windings S1 in an electromagnetic coupling way, such that the two first secondary windings S1 separately generate the output AC electric energy.

The transformer T2 of the magnetic component M has a second primary winding N2 and two second secondary windings S2. Two outlet terminals of the second primary winding N2 are electrically connected to the resonant circuit 17, respectively, and the first primary winding N1 and the second primary winding N2 are connected in parallel. Moreover, the second primary winding N2 is actually formed of a third coil N21 and a fourth coil N22 (as shown in FIG. 2) connected in series. But it is not limited thereto, the third coil N21 and the fourth coil N22 may also be connected in parallel. The two second secondary windings S2 are center tap structures, respectively. When receiving the transition AC electric energy transmitted from the inverter circuit 16, the second primary winding N2 of the transformer T2 transmits the transition AC electric energy to the two second secondary windings S2 in an electromagnetic coupling way, such that the two second secondary windings S2 separately generate the output AC electric energy.

In some embodiments, the transformers T1 and T2 are PCB transformers, that is, the first primary winding N1 and the two first secondary windings S1 of the transformer T1, and the second primary winding N2 and the two second secondary windings S2 of the transformer T2 may be formed of PCB coils, respectively, but they are not limited thereto. In other embodiments, the first primary winding N1 and the two first secondary windings S1 of the transformer T1, and the second primary winding N2 and the two second secondary windings S2 of the transformer T2 may be formed of conductive wires, respectively. Furthermore, in other embodiments, since the first primary winding N1 and the second primary winding N2 are connected in parallel, the number of coil turns of the first primary winding N1 and the second primary winding N2 after being connected in parallel may be an odd number, such as, five, but it is not limited thereto, and it may also be an even number. In addition, the resonant capacitor Cr and the parallel-connected first and second primary windings N1 and N2 are connected in series.

The number of the rectifying circuits 18 corresponds to the number of secondary windings (the first secondary windings S1 and the second secondary windings S2) comprised in the magnetic component M, as shown in FIG. 1, the converting circuit 14 comprises four rectifying circuits 18, each of which is electrically connected to corresponding secondary winding for rectifying the output AC electric energy generated by the corresponding secondary winding to generate DC electric energy.

The number of the output filter circuits 19 corresponds to the number of the rectifying circuits 18, as shown in FIG. 1, the converting circuit 14 comprises four output filter circuits 19, wherein input terminals of each of the output filter circuits 19 are electrically connected to output terminals of the corresponding rectifying circuit 18. The output terminals of all the output filter circuits 19 are connected in parallel, thereby being electrically connected to the positive output terminal 12 and the negative output terminal 13. Each of the output filter circuits 19 filters the DC electric energy generated by the rectifying circuit 18, and because the output terminals of the plurality of output filter circuits 19 are connected in parallel, the output electric energy received by the Load actually equals to an sum of the filtered DC electric energy output from the plurality of output filter circuits 19.

In some embodiments, in order to achieve current equalization in the transformers T1 and T2, the number of coil turns of the first primary winding N1 of the transformer T1 equals to the number of coil turns of the second primary winding N2 of the transformer T2, and the number of coil turns of the two first secondary windings S1 of the transformer T1 is the same as that of the two second secondary windings S2 of the transformer T2.

The detailed structure of the magnetic component M is further explained below. Please refer to FIG. 2, in the above embodiment, the magnetic component M comprises a magnetic core, the first primary winding N1, the two first secondary windings S1, the second primary winding N2 and the two second secondary windings S2. The magnetic core comprises an upper magnetic core portion M11, a lower magnetic core portion M12 and four core columns M13 (in order to facilitate explaining, the four core columns are referred as first, second, third and fourth core columns in the following partial contents) sharing the upper and lower magnetic core portions M11 and M12. In this embodiment, the four core columns M13 are disposed between the upper and lower magnetic core portions M11 and M12, and the four core columns M13 are actually not in a straight line. Moreover, each of the core columns M13 is actually formed of an upper column M130 and a lower column M131, with the upper column M130 vertically extending downwards from a quasi-rectangular first surface of the upper magnetic core portion M11, and the lower column M131 vertically extending upwards from a quasi-rectangular second surface which faces the first surface of the upper magnetic core portion M11 in the lower magnetic core portion M12. Actually, the four upper columns M130 of the four core columns M13 may be located at four corners of the first surface of the upper magnetic core portion M11, and a position of each of the lower columns M131 corresponds to a position of the upper column M130, so the lower columns M131 of the four core columns M13 are located at four corners of the second surface of the lower magnetic core portion M12.

The first primary winding N1 is wound around any two of the core columns M13 (for example, the first and second core columns) of the magnetic core, so the two core columns M13 wound by the first primary winding N1 and the upper and lower magnetic core portions M11 and M12 form a first closed magnetic circuit. The second primary winding N2 is wound around the remaining two core columns M13 (for example, the third and fourth core columns), so the core columns M13 wound by the second primary winding N2 and the upper and lower magnetic core portions M11 and M12 form a second closed magnetic circuit. Moreover, when the first primary winding N1 and the second primary winding N2 are wound around the corresponding two core columns M13 of the magnetic core, respectively, they are not directly connected to form a series-connected relation. The first primary winding N1 and the second primary winding N2 independently receive the transition AC electric energy transmitted from the inverter circuit 16, respectively.

Figure 3A:
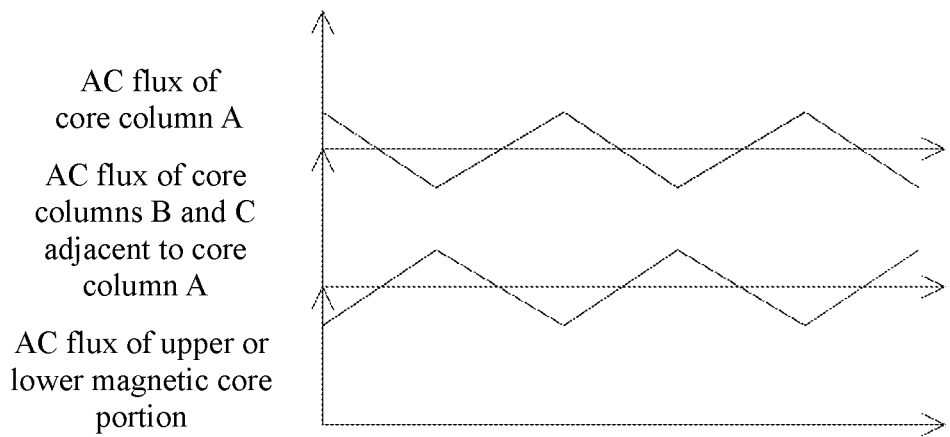
FIG. 3(a) is an AC flux waveform diagram in the magnetic component shown in FIG. 2, wherein AC flux cancellation occurs in an upper magnetic core portion or a lower magnetic core portion when the AC fluxes on any two adjacent core columns are opposite in direction.
Figure 3B:
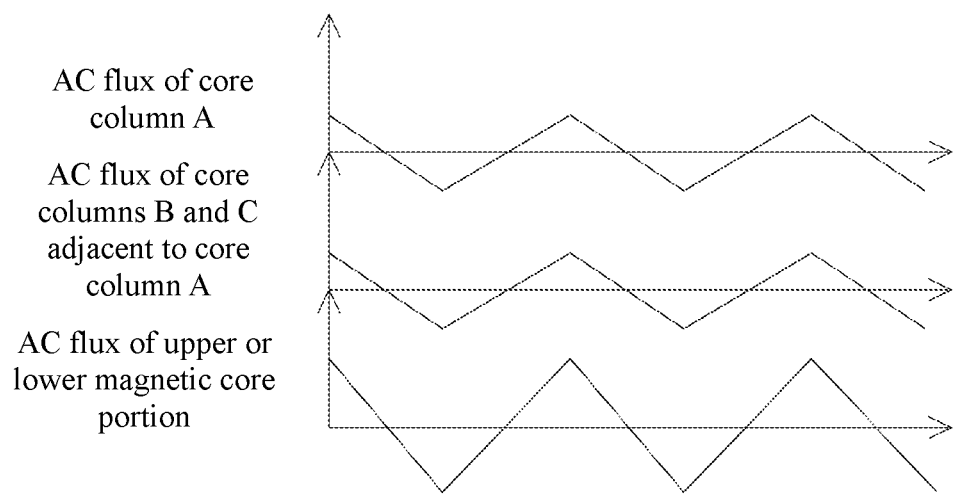
FIG. 3(b) exemplary illustrates an AC flux waveform diagram in the magnetic component shown in FIG. 2, wherein the AC flux cancellation does not occur in the upper or lower magnetic core portion when the AC fluxes on any two adjacent core columns are in the same direction, as a contrast to FIG. 3(a).

The two first secondary windings S1 are separately wound around the corresponding core columns M13 (for example, one first secondary winding S1 is wound around the first core column, and the other first secondary winding S1 is wound around the second core column), and the two second secondary windings S2 are also separately wound around the corresponding remaining core columns M13 (for example, one second secondary winding S2 is wound around the third core column, and the other second secondary winding S2 is wound around the fourth core column). In addition, please refer to FIGS. 3(a) and 3(b), FIG. 3(a) is an AC flux waveform diagram in the magnetic component shown in FIG. 2, wherein AC flux cancellation occurs in an upper magnetic core portion or a lower magnetic core portion when the AC fluxes on any two adjacent core columns are opposite in direction, and FIG. 3(b) exemplary illustrates an AC flux waveform diagram in the magnetic component shown in FIG. 2, wherein the AC flux cancellation does not occur in the upper or lower magnetic core portion when the AC fluxes on any two adjacent core columns are in the same direction, as a contrast to FIG. 3(a). In this embodiment, an external volt-second of the first primary winding N1 determines an AC flux within the core columns of the first closed magnetic circuit, and an external volt-second of the second primary winding N2 determines an AC flux within the core columns of the second closed magnetic circuit. The winding manner of the first primary winding N1 and the second primary winding N2 allows directions of the AC flux on any two adjacent core columns M13 to be opposite (that is, in the four core columns M13, the direction of the AC flux of the two core columns M13 located on one diagonal line is towards the first direction, the direction of the AC flux of another two core columns M13 located on the other diagonal line is towards the second direction, and the first direction is opposite to the second direction, that is, as shown by the arrows on the lower magnetic core portion M12 in FIG. 2), so the AC flux on the upper magnetic core portion M11 may be cancelled, and the AC flux on the lower magnetic core portion M12 also may be cancelled, such that the AC fluxes of the upper and lower magnetic core portions M11 and M12 may be reduced. That is, as shown in FIG. 3(a), when the direction of the AC flux of any one core column M13 (in order to facilitate explaining, the one core column M13 in FIGS. 3(a) and 3(b) is referred to as core column A temporarily) is opposite to that of the adjacent core columns M13 (in order to facilitate explaining, the core columns M13 adjacent to the core column A in FIGS. 3(a) and 3(b) are referred to as core columns B and C temporarily), it can be known from FIG. 3(a) that the AC flux on the upper magnetic core portion M11 and the AC flux on the lower magnetic core portion M12 in the present invention may cancel out so as to obtain the advantage of reducing core loss of the upper and lower magnetic core portions M11 and M12. Therefore, as a contrast, as shown in FIG. 3(b), the direction of the AC flux of the core column A is the same as that of the core columns B and C, so that the magnetic flux on the upper magnetic core portion M11 and the AC flux on the lower magnetic core portion M12 are overlapped, instead of being cancelled out with each other, and that it is unable to obtain the advantage of reducing core loss of the upper and lower magnetic core portions M11 and M12. This embodiment indeed enables the AC fluxes of the upper and lower magnetic core portions M11 and M12 to be reduced if the AC fluxes on any two adjacent core columns M13 are opposite in direction. As a result, a sum of an AC flux peak-peak value within a single core column of the first closed magnetic circuit, and an AC flux peak-peak value within a single core column of the second closed magnetic circuit is larger than an AC flux peak-peak value within the upper magnetic core portion M11, and is also larger than an AC flux peak-peak value within the lower magnetic core portion M12, such that loss of the magnetic core of the upper and lower magnetic core portions M11 and M12 is reduced. Even further, the first primary winding N1, the two first secondary windings S1 and the magnetic core form the transformer T1, and the second primary winding N2, the two second secondary windings S2 and the magnetic core form the transformer T2.

In the above embodiment, the first primary winding N1 of the transformer T1 and the second primary winding N2 of the transformer T2 are formed of a PCB coil 20. The PCB coil 20 comprises a plurality of first through holes 21, each of which may be passed through by the corresponding core column M13. In addition, the two first secondary windings S1 of the transformer T1 and the two second secondary windings S2 of the transformer T2 are formed of a PCB coil 22. The PCB coil 22 comprises a plurality of second through holes 23, each of which may be passed through by the corresponding core column M13.

In this embodiment, since the power conversion device 1 actually uses the transformers T1 and T2 in the converting circuit 14 to perform electric energy conversion, and when an deviation of inductance between the first primary winding N1 of the transformer T1 and the second primary winding N2 of the transformer T2 meets the following formula, that is, $|Lm1-Lm2|/(Lm1+Lm2)<=30\%;$ a difference of a magnetizing current and a difference of magnetizing current loss both generated between the transformers T1 and T2 may be within a controllable range, wherein Lm1 is the inductance of the first primary winding N1, and Lm2 is the inductance of the second primary winding N2. In such way, not only the power of the transformers T1 and T2 can be halved, but also widths and thicknesses of coils in the first primary winding N1, the second primary winding N2, the first secondary windings S1, and the second secondary windings S2 of the transformers T1 and T2 are also controlled within reasonable ranges, so parasitic resistances and thermal resistances of the first primary winding N1, the second primary winding N2, the first secondary windings S1, and the second secondary windings S2 are effectively reduced. Furthermore, since the two core columns M13 cooperating with the upper and lower magnetic core portions M11 and M12 in the magnetic component M of the present invention actually form a structure similar with the U-core, the magnetic core comprising four core columns M13 may be viewed as a combination of a plurality of U-cores, so when the winding wound onto the magnetic component M in the present invention is a PCB coil, a foot print size of the PCB coil may be reduced. In addition, since the magnetic component M in the present invention may be viewed as a combination of a plurality of U-cores, the heat dissipation effect of the winding on the magnetic component M is better. Even further, since the magnetic core of the magnetic component M in the present invention may be viewed as a plurality of U-cores sharing the upper magnetic core portion M11 and sharing the lower magnetic core portion M12, as compared to using a plurality of independent and uncombined U-cores, sectional areas of the upper and lower magnetic core portions M11 and M12 of the magnetic component M in the present invention increase, and AC magnetic densities in the upper and lower magnetic core portions M11 and M12 decrease, so loss of the upper and lower magnetic core portions M11 and M12 may be reduced, and efficiency of the power conversion device 1 is improved. Even further, since the AC fluxes on any two adjacent core columns M13 of the magnetic core of the magnetic component M in the present invention are opposite in direction, a magnitude of an AC flux density on the upper and lower magnetic core portions M11 and M12 is further decreased. In such way, loss of the magnetic core of the upper and lower magnetic core portions M11 and M12 may be further reduced, and efficiency of the power conversion device 1 is further improved.

Figure 4:
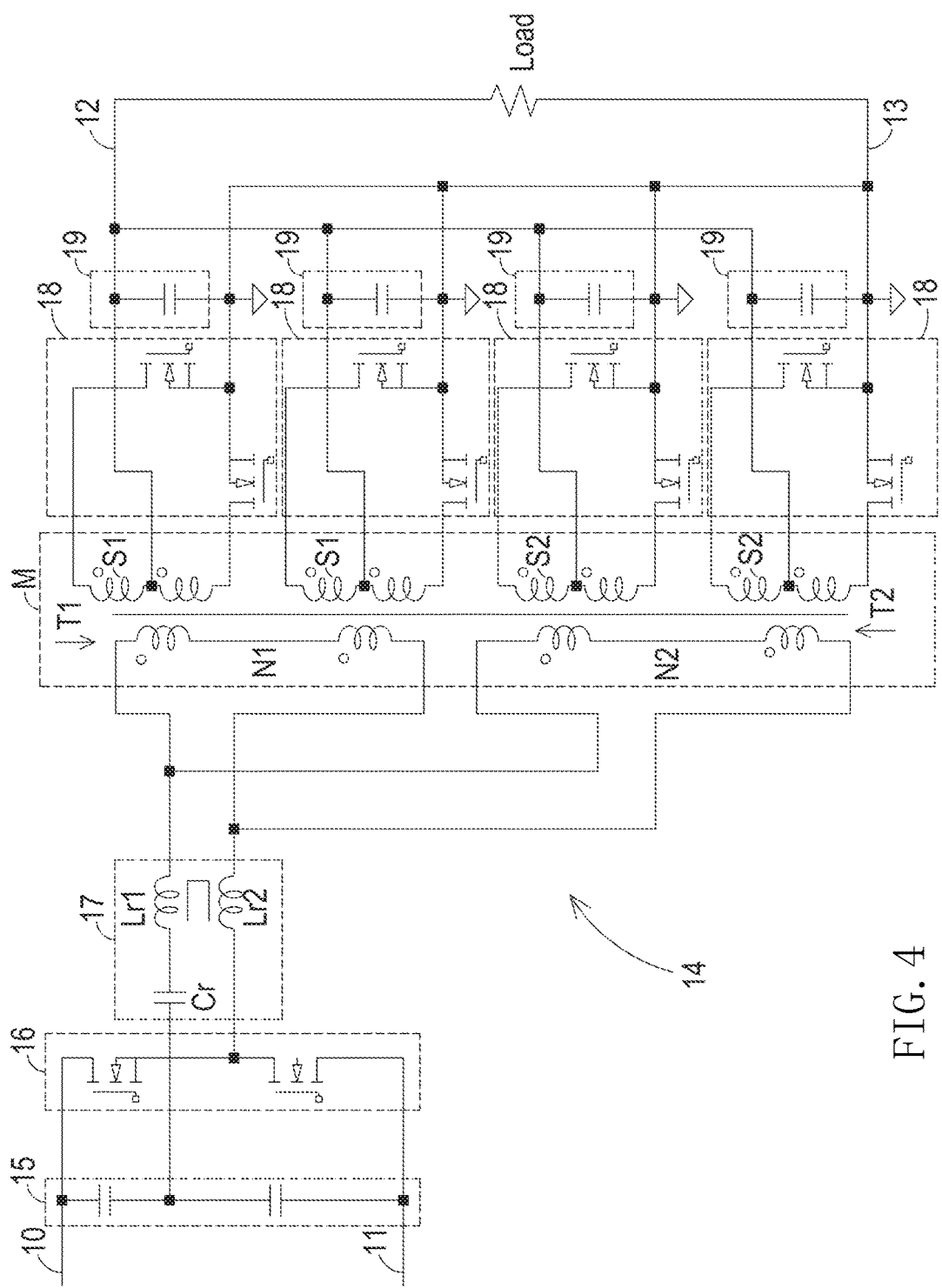
FIG. 4 is a schematic diagram of a circuit structure of a power conversion device in the second preferred embodiment of the present invention.

Please refer to FIG. 4 and FIG. 2, of which FIG. 4 is a schematic diagram of a circuit structure of a power conversion device in the second preferred embodiment of the present invention. As shown in FIG. 4, the circuit structure of a power conversion device 2 in this embodiment is similar with the power conversion device 1 shown in FIG. 1, so same signs are marked to represent similar structure and operation of the circuit. By comparison, the resonant circuit 17 of the power conversion device 1 as shown in FIG. 1 comprises the resonant capacitor Cr and the single resonant inductor Lr, whereas the resonant circuit 17 of the power conversion device 2 in this embodiment comprises a resonant capacitor Cr and two resonant inductors Lr1 and Lr2 connected in series indirectly (that is, there are other components connected in series between the two resonant inductors Lr1 and Lr2), wherein the two resonant inductors Lr1 and Lr2 may share the upper and lower magnetic core portions. In some other embodiments, the two resonant inductors Lr1 and Lr2 may also be connected in parallel. The two resonant inductors Lr1 and Lr2 may also use the magnetic core shown in FIG. 2 to form a magnetic component, that is, the magnetic component comprising the magnetic core shown in FIG. 2, a first winding of the resonant inductor Lr1, and a second winding of the resonant inductor Lr2. A structure of the magnetic component consisting of the magnetic core, the first winding of the resonant inductor Lr1, and the second winding of the resonant inductor Lr2 is actually similar with that of the magnetic component M shown in FIG. 2, and the difference is only in that, the first winding of the resonant inductor Lr1 and the second winding of the resonant inductor Lr2 can be formed by one PCB coil, such as the PCB coil 20 as shown in FIG. 2, without the need of the PCB coil 22.

The first winding of the resonant inductor Lr1 is wound around any two core columns M13 (for example, the first and second core columns) of the magnetic core, so the two core columns M13 wound by the first winding of the resonant inductor Lr1 and the upper and lower magnetic core portions M11 and M12 form a first closed magnetic circuit, and the second winding of the resonant inductor Lr2 is wound around the remaining two core columns M13 (for example, the third and fourth core columns), so the two core columns M13 wound by the second winding of the resonant inductor Lr2 and the upper and lower magnetic core portions M11 and M12 form a second closed magnetic circuit. Moreover, when the first winding of the resonant inductor Lr1 and the second winding of the resonant inductor Lr2 are wound around the corresponding two core columns M13 on the magnetic core, they are not directly connected to form a series-connection. In addition, in this embodiment, the winding manner of the first winding of the resonant inductor Lr1 and the second winding of the resonant inductor Lr2 onto the core columns M13 of the magnetic core allows the AC fluxes on any two adjacent core columns M13 to be opposite in direction. Even further, a sum of an AC flux peak-peak value within the single core column of the first closed magnetic circuit formed of the two core columns M13 wound by the first winding of the resonant inductor Lr1 and the upper and lower magnetic core portions M11 and M12, and an AC flux peak-peak value within the single core column of the second closed magnetic circuit formed of the two core columns M13 wound by the second winding of the resonant inductor Lr2 and the upper and lower magnetic core portions M11 and M12 is larger than an AC flux peak-peak value within the upper magnetic core portion M11, and is also larger than an AC flux peak-peak value within the lower magnetic core portion M12.

Figure 5:
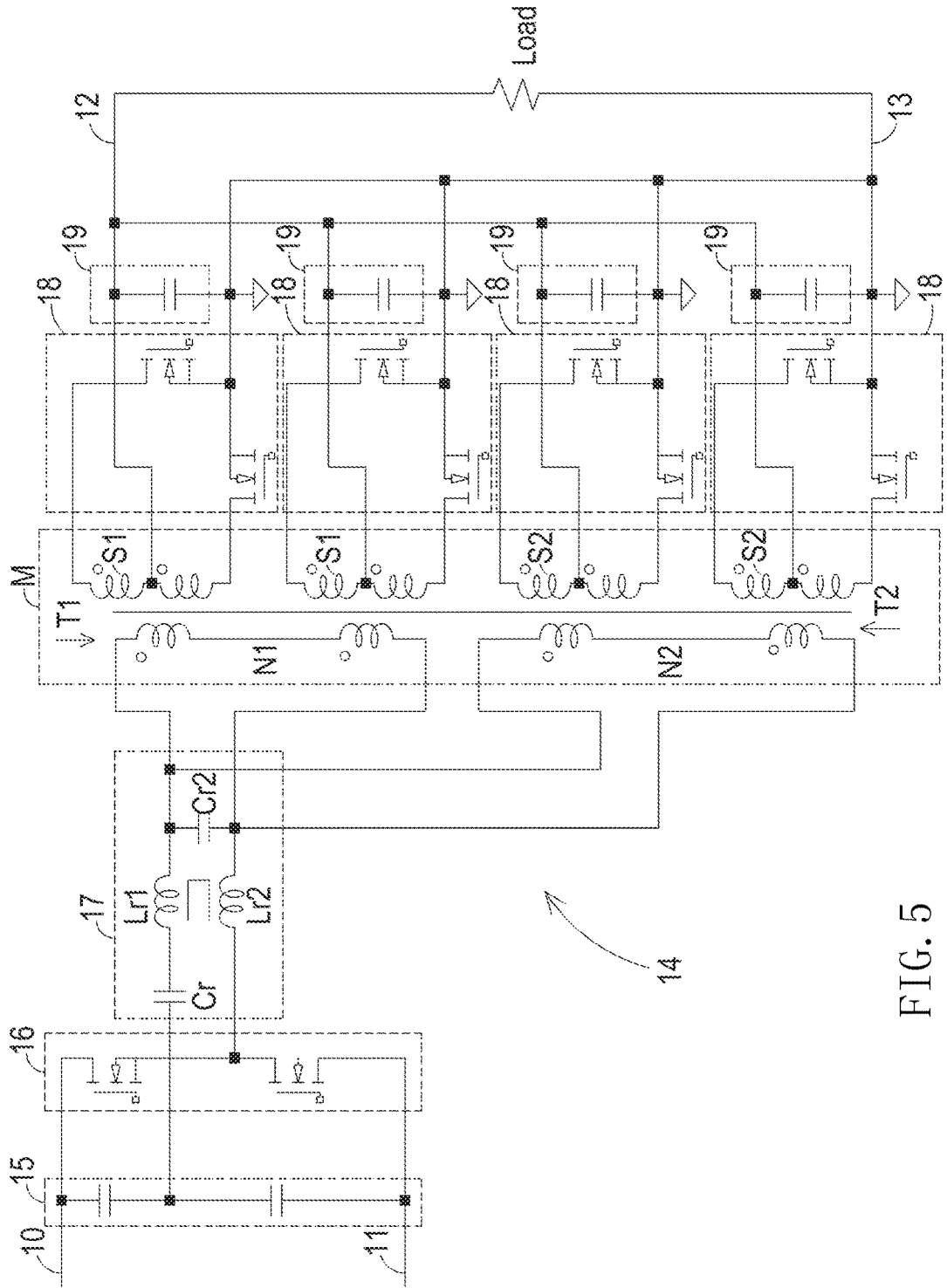
FIG. 5 is a schematic diagram of a circuit structure of a power conversion device in the third preferred embodiment of the present invention.

Of course, the resonant circuit 17 is not limited to a LLC resonant circuit shown in FIG. 4. In some embodiments, as shown in FIG. 5, the resonant circuit 17 of a power conversion device 3 also may be a LCC resonant circuit. In other words, except comprising a resonant capacitor Cr and two resonant inductors Lr1 and Lr2 coupling to each other, the resonant circuit 17 further comprises another resonant capacitor Cr2, wherein the resonant capacitor Cr2 is connected between two outlet terminals of the first primary winding N1, and is also connected between two outlet terminals of the second primary winding N2.

Figure 6:
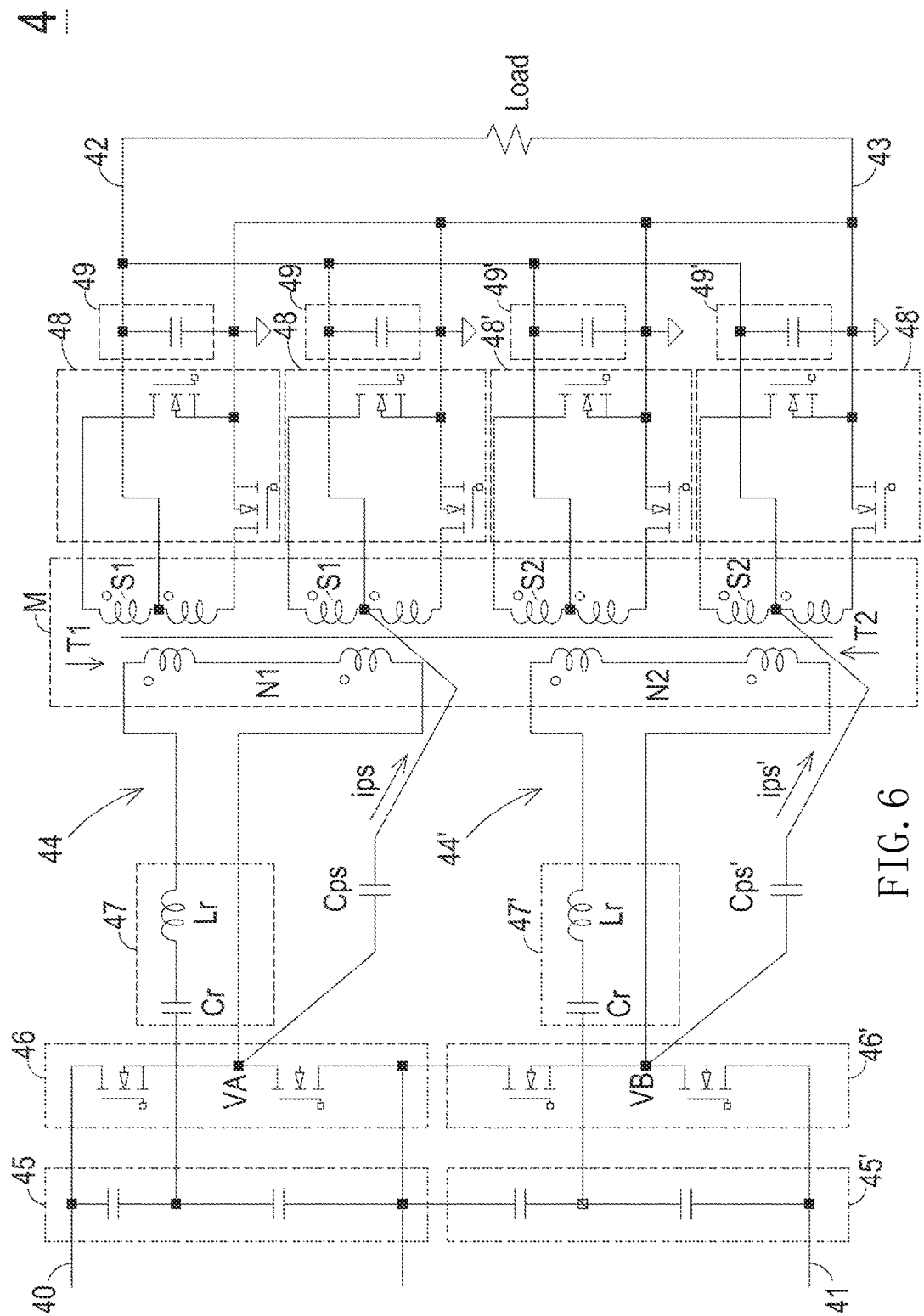
FIG. 6 is a schematic diagram of a circuit structure of a power conversion device in the fourth preferred embodiment of the present invention.

Please refer to FIG. 6 and FIG. 2, of which FIG. 6 is a schematic diagram of a circuit structure of a power conversion device in the fourth preferred embodiment of the present invention. As shown in FIG. 6, a power conversion device 4 of this embodiment may be, but is not limited to, a DC/DC converter to convert input electric energy into output electric energy for the Load, and comprises a positive input terminal 40, a negative input terminal 41, a positive output terminal 42, a negative output terminal 43, and two converting circuits 44 and 44'. The power conversion device 4 receives the input electric energy via the positive input terminal 40 and the negative input terminal 41, and outputs the output electric energy via the positive output terminal 42 and the negative output terminal 43.

The two converting circuits 44 and 44' have the same circuit structure, so only the converting circuit 44 is described specifically below. In this embodiment, the converting circuits 44 and 44' may be, but are not limited to, the resonance type converting circuits, respectively. An input terminal of the converting circuit 44 and an input terminal of the converting circuit 44' are connected in series, and are electrically connected between the positive input terminal 40 and the negative input terminal 41. Output terminals of the converting circuit 44 and output terminals of the converting circuit 44' are connected in parallel, and are electrically connected between the positive output terminal 42 and the negative output terminal 43. The converting circuits 44 and 44' are for converting the input electric energy, respectively, such that the power conversion device 4 outputs the output electric energy to the Load through the two converting circuits 44 and 44'. The converting circuit 44 comprises an input filter circuit 45, an inverter circuit 46 (or, a switching circuit), a resonant circuit 47, a transformer T1, a plurality of rectifying circuits 48, and a plurality of output filter circuits 49. The converting circuit 44' comprises an input filter circuit 45', an inverter circuit 46' (or, a switching circuit), a resonant circuit 47', a transformer T2, a plurality of rectifying circuits 48', and a plurality of output filter circuits 49'.

The input filter circuit 45 is electrically connected between the positive input terminal 40 and the negative input terminal 41 for filtering the input electric energy. In some embodiments, the input filter circuit 45 may comprise two input capacitors connected in series.

The inverter circuit 46 is electrically connected to an output terminal of the input filter circuit 45 for converting the filtered input electric energy into transition AC electric energy. In some embodiments, the inverter circuit 46 may comprise two switch components connected in series, and the two switch components form a half-bridge circuit structure.

The resonant circuit 47 is electrically connected to the output terminal of the input filter circuit 45 and an output terminal of the inverter circuit 46. In some embodiments, the resonant circuit 47 may be formed of a resonant capacitor Cr and a resonant inductor Lr connected in series.

The transformer T1 has a first primary winding N1 and two first secondary windings S1. Two outlet terminals of the first primary winding N1 are electrically connected to the resonant circuit 47, respectively, and the first primary winding N1 is actually formed of the two coils connected in series. But it is not limited thereto, and the two coils may also be connected in parallel. The two first secondary windings S1 are center tap structures, respectively. When receiving the transition AC electric energy transmitted from the inverter circuit 46, the first primary winding N1 of the transformer T1 transmits the transition AC electric energy to the two first secondary windings S1 in an electromagnetic coupling way, such that the two first secondary windings S1 separately generate the output AC electric energy. Similarly, the transformer T2 has a second primary winding N2 and two second secondary windings S2, and since the structure and operation of the transformer T2 are the same as that of the transformer T1, the details will not be described here.

The number of the rectifying circuits 48 corresponds to the number of secondary windings S1 comprised by the transformer T1, as shown in FIG. 1, the converting circuit 44 comprises two rectifying circuits 48, each of which is electrically connected to the corresponding first secondary winding S1 for rectifying the output AC electric energy generated by the corresponding secondary winding S1 to generate DC electric energy.

The number of the output filter circuits 49 corresponds to the number of the rectifying circuits 48. So as shown in FIG. 1, the converting circuit 44 comprises two output filter circuits 49, wherein input terminals of each of the output filter circuits 49 are separately electrically connected to output terminals of the corresponding rectifying circuit 48, and output terminals of each of the output filter circuits 49 are connected to output terminals of all other output filter circuits 49 in parallel, thereby being electrically connected to the positive output terminal 42 and the negative output terminal 43. Each of the output filter circuits 49 filters the DC electric energy generated by the rectifying circuit 48.

Please refer to FIG. 2, in this embodiment, the two transformers T1 and T2 of the two converting circuits 44 and 44' also may use the magnetic core shown in FIG. 2 to form the magnetic component similar as shown in FIGS. 1 and 2, that is, the first primary winding N1 of the transformer T1 of one converting circuit 44 is wound around any two core columns M13 (for example, the first and second core columns) of the magnetic core shown in FIG. 2, so the core columns M13 wound by the first primary winding N1 of the transformer T1 of the one converting circuit 44 and the upper and lower magnetic core portions M11 and M12 form a first closed magnetic circuit, and the second primary winding N2 of the transformer T2 of the other converting circuit 44' is wound around the remaining two core columns M13 (for example, the third and fourth core columns), so the core columns M13 wound by the second primary winding N2 of the transformer T2 of the other converting circuit 44' and the upper and lower magnetic core portions M11 and M12 form a second closed magnetic circuit.

In addition, the two first secondary windings S1 of the transformer T1 of the one converting circuit 44 are separately wound around the corresponding core columns M13 (for example, one first secondary winding S1 is wound around the first core column, and the other first secondary winding S1 is wound around the second core column), and the two second secondary windings S2 of the transformer T2 of the other converting circuit 44' are also separately wound around the corresponding remaining core columns M13 (for example, one second secondary winding S2 is wound around the third core column, and the other second secondary winding S2 is wound around the fourth core column). Furthermore, in this embodiment, the winding manner of the first primary winding N1 of the transformer T1 of the converting circuit 44 and the winding manner of the second primary winding N2 of the transformer T2 of the other converting circuit 44' allow AC fluxes on any two adjacent core columns M13 to be opposite in direction, or 180° phase shifted.

In the above embodiment, the input terminals of the two converting circuits 44 and 44' may be connected in series. The inverter circuits 46 and 46' may be, but are not limited to, in phase inverter circuits, and they may be 180° phase shifted inverter circuits. When the two converting circuits 44 and 44' are in phase, the winding manner of the primary windings N1 and N2 of the two transformers T1 and T2 of the two converting circuits 44 and 44' allows the AC fluxes on any two adjacent core columns M13 to be opposite in direction, such that the AC fluxes of the upper and lower magnetic core portions M11 and M12 may be cancelled and reduced. When the two converting circuits 44 and 44' are 180° phase shifted, the winding manner of the primary windings N1 and N2 of the two transformers T1 and T2 of the two converting circuits 44 and 44' allows the AC fluxes on any two adjacent core columns M13 to be 180° phase shifted, such that the AC fluxes of the upper and lower magnetic core portions M11 and M12 may be cancelled and reduced, respectively. As a result, A sum of an AC flux peak-peak value within the single core column of the first closed magnetic circuit, and an AC flux peak-peak value within the single core column of the second closed magnetic circuit is larger than an AC flux peak-peak value within the upper magnetic core portion M11, and is also larger than an AC flux peak-peak value within the lower magnetic core portion M12.

Figure 7:
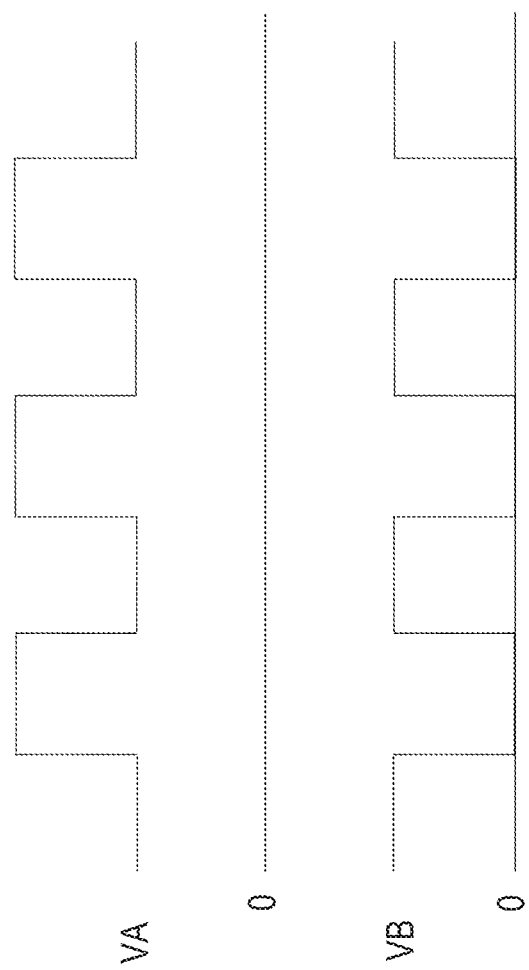
FIG. 7 is waveform diagrams of a voltage between a middle of a bridge arm of an inverter circuit of one converting circuit and a negative input terminal and a voltage between a middle of a bridge arm of an inverter circuit of the other converting circuit and the negative input terminal in the power conversion device as shown in FIG. 6.

In some embodiments, in order to obtain better EMI performance, an upper switch in a bridge arm of the inverter circuit 46 and an upper switch in a bridge arm of the inverter circuit 46' are 180° phase shifted, such that a voltage VA between a middle of the bridge arm of the inverter circuit 46 and a negative input terminal 41, and a voltage VB between a middle of the bridge arm of the inverter circuit 46' and the negative input terminal 41 are opposite in jumping direction or 180° phase shifted (as shown in FIG. 7). A common-mode current ips is formed by the voltage VA at the middle of the bridge arm of the inverter circuit 46 through a parasitic capacitor Cps between the primary and the secondary coils of the transformer T1, and a common-mode current ips' is formed by the voltage VB at the middle of the bridge arm of the inverter circuit 46' through a parasitic capacitor Cps' between the primary and the secondary coils of the transformer T2. As a result, the common-mode current ips and the common-mode current ips' are opposite in direction or 180° phase shifted, and common-mode noises are cancelled. So the power conversion device 4 may obtain better EMI performance directly by making use of the controlling manner in which the upper switches in the bridge arms of the two converting circuits 44 and 44' are 180° phase shifted, without adding EMI filters additionally, and thus achieve the advantage of reducing production costs.

Figure 8:
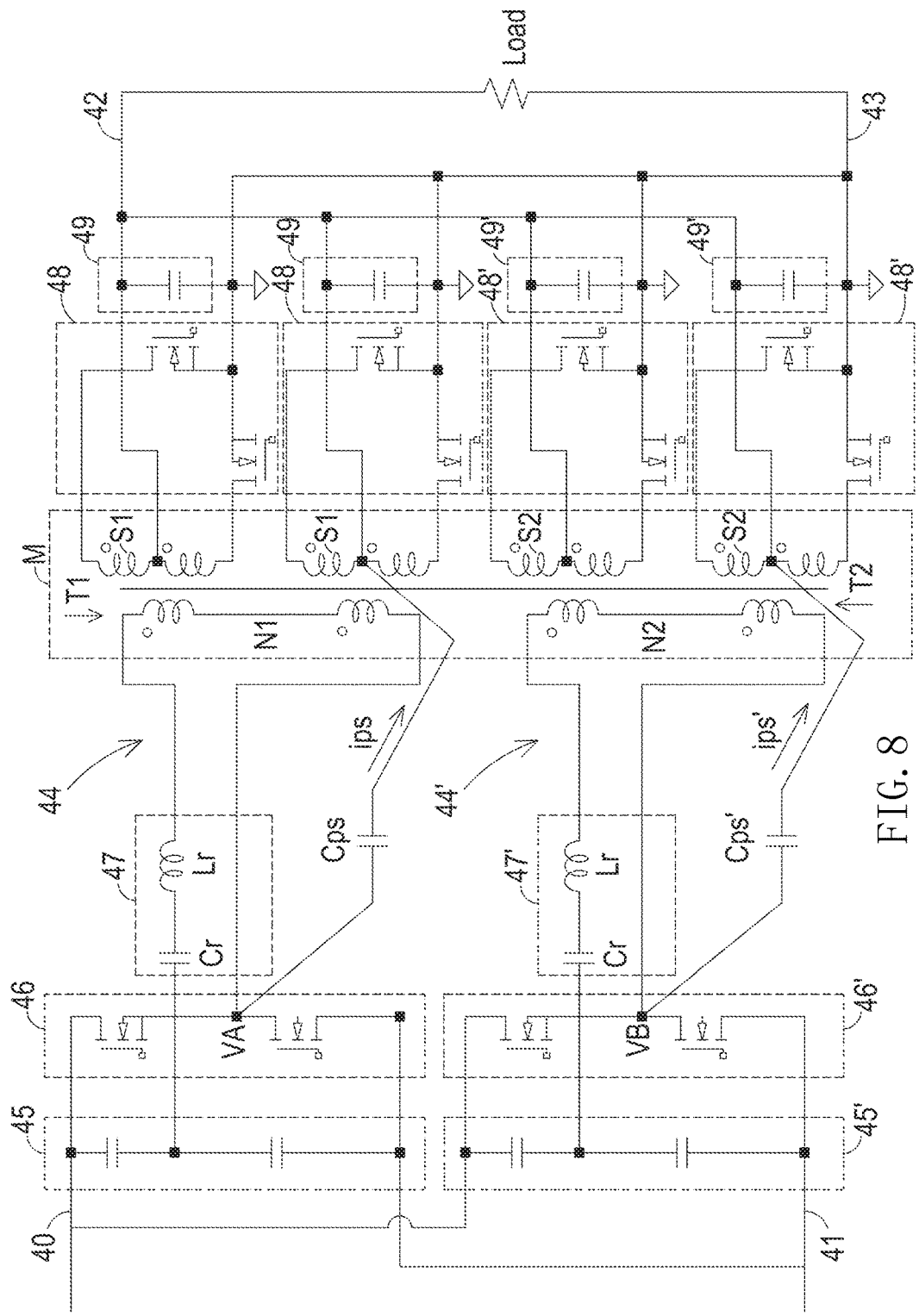
FIG. 8 is a schematic diagram of a circuit structure of a power conversion device in the fifth preferred embodiment of the present invention.
Figure 9:
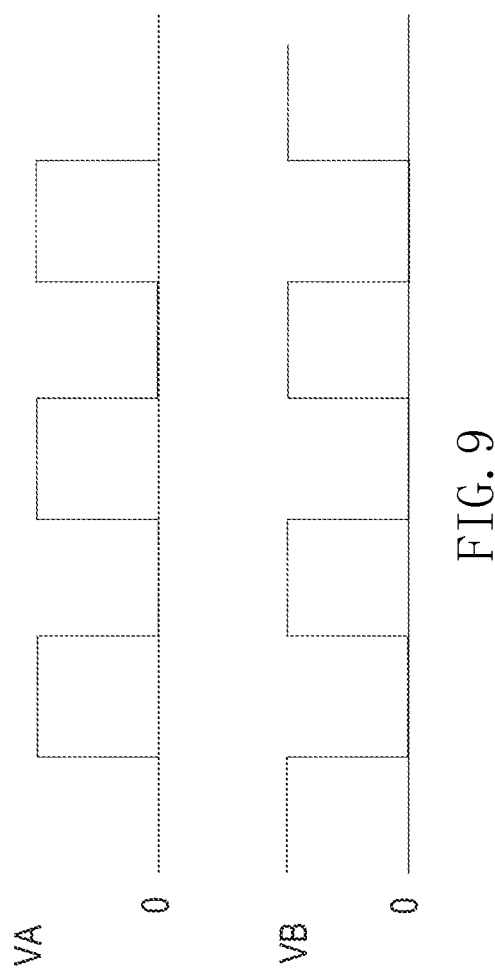
FIG. 9 is waveform diagrams of a voltage between a middle of a bridge arm of an inverter circuit of one converting circuit and a negative input terminal and a voltage between a middle of a bridge arm of an inverter circuit of the other converting circuit and the negative input terminal in the power conversion device as shown in FIG. 8.

Such concept of common-mode cancellation not only can be applied to two input-series converters but also can be applied to two input-parallel converters, and details are shown in FIG. 8. Since inputs of the two converters are parallel, waveforms of a voltage VA between a middle of the bridge arm of the inverter circuit 46 and a negative input terminal 41, and a voltage VB between a middle of the bridge arm of the inverter circuit 46' and a negative input terminal 41 are shown in FIG. 9; a difference from FIG. 7 is that voltage VA does not have a DC bias Vin/2. Voltage VA and voltage VB are opposite in jumping direction or 180° phase shifted, the common-mode current ips formed by the voltage VA through the primary secondary parasitic capacitor Cps of the transformer T1, and the common-mode current ips' formed by the voltage VB through the primary secondary parasitic capacitor Cps' of the transformer T2 are opposite in direction or 180° phase shifted, and the common-mode noises are cancelled.

Of course, the above two converting circuits 44 and 44' are not limited to the circuit architecture of the resonance type converting circuit, and in other embodiments, the two converting circuits may be a PWM type converter circuit, respectively.

Figure 10:
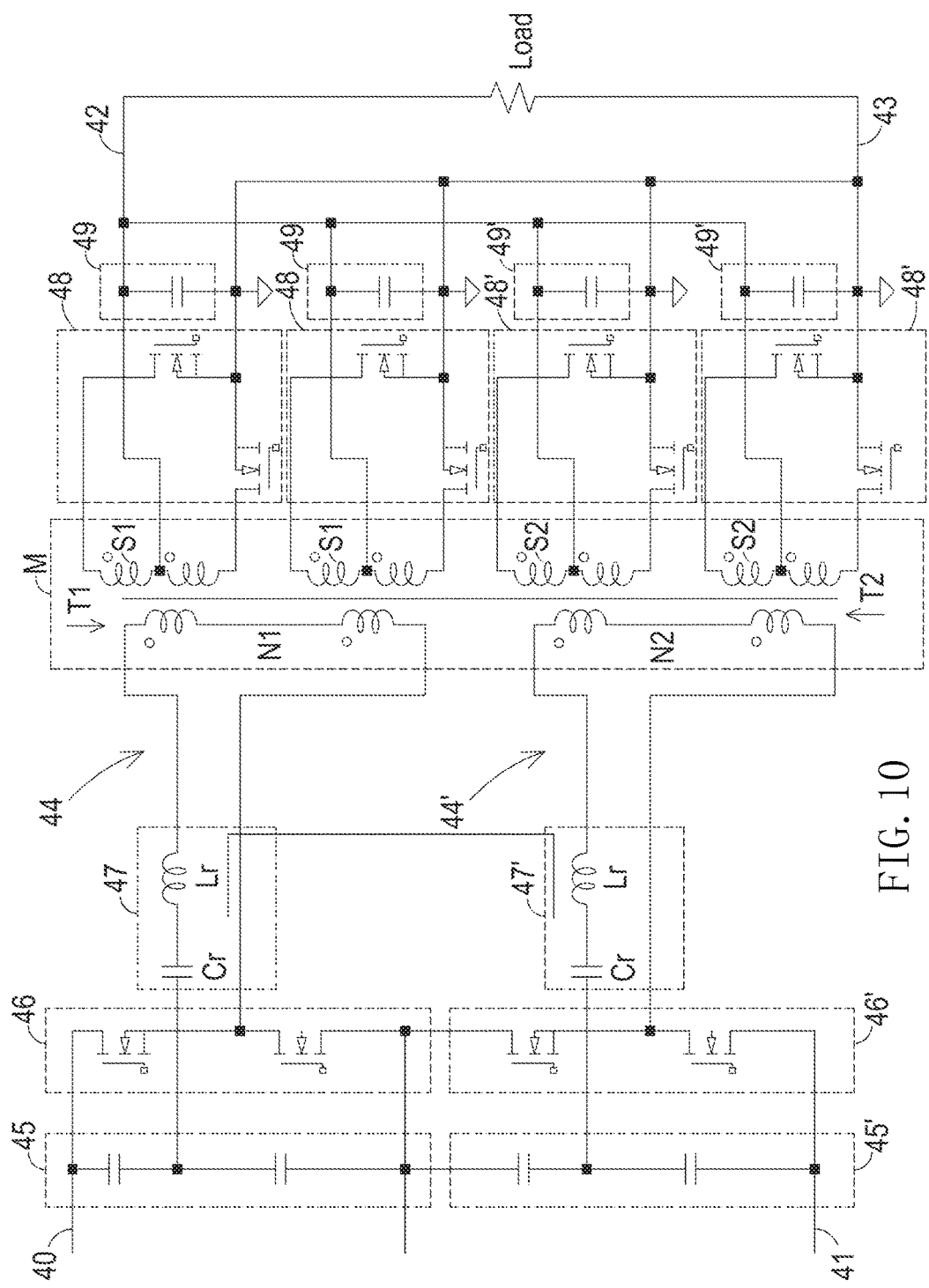
FIG. 10 is a schematic diagram of a circuit structure of a power conversion device in the sixth preferred embodiment of the present invention.

Please refer to FIG. 10, which is a schematic diagram of a circuit structure of a power conversion device in the sixth preferred embodiment of the present invention. As shown in FIG. 10, the circuit architecture of a power conversion device 5 in this embodiment is similar with that of the power conversion device 4 shown in FIG. 6, so the same signs are marked to represent similar structure and operation of the circuit, and the details will not be described here. A difference between the power conversion device 5 of this embodiment and the power conversion device 4 shown in FIG. 6 is that two resonant inductors Lr in two resonant circuits 47 and 47' of the power conversion device 5 in this embodiment share upper and lower magnetic core portions, and actually, the two resonant inductors Lr may also use the magnetic core shown in FIG. 2 to form the magnetic component, that is, the magnetic component comprising the magnetic core shown in FIG. 2, the first winding of the resonant inductor Lr of the resonant circuit 47, and the second winding of the resonant inductor Lr of the resonant circuit 17'.

The first winding of the resonant inductor Lr of the resonant circuit 17 is wound around any two core columns M13 (for example, the first and second core columns) of the magnetic core, so the core columns M13 wound by the first winding of the resonant inductor Lr of the resonant circuit 17 and the upper and lower magnetic core portions M11 and M12 form a first closed magnetic circuit, and the second winding of the resonant inductor Lr of the resonant circuit 17' is wound around the remaining two core columns M13 (for example, the third and fourth core columns), so the core columns M13 wound by the second winding of the resonant inductor Lr of the resonant circuit 47' and the upper and lower magnetic core portions M11 and M12 form a second closed magnetic circuit. In addition, in this embodiment, a winding manner of the first winding of the resonant inductor Lr of the resonant circuit 47 and the second winding of the resonant inductor Lr of the resonant circuit 47' onto the core columns M13 of the magnetic core allows AC fluxes on any two adjacent core columns M13 to be opposite in direction, or 180° phase shifted. Even further, an AC flux peak-peak value within the single core column of the first closed magnetic circuit and an AC flux peak-peak value within the single core column of the second closed magnetic circuit is larger than an AC flux peak-peak value within the upper magnetic core portion M11, and is also larger than an AC flux peak-peak value within the lower magnetic core portion M12.

Figure 11:
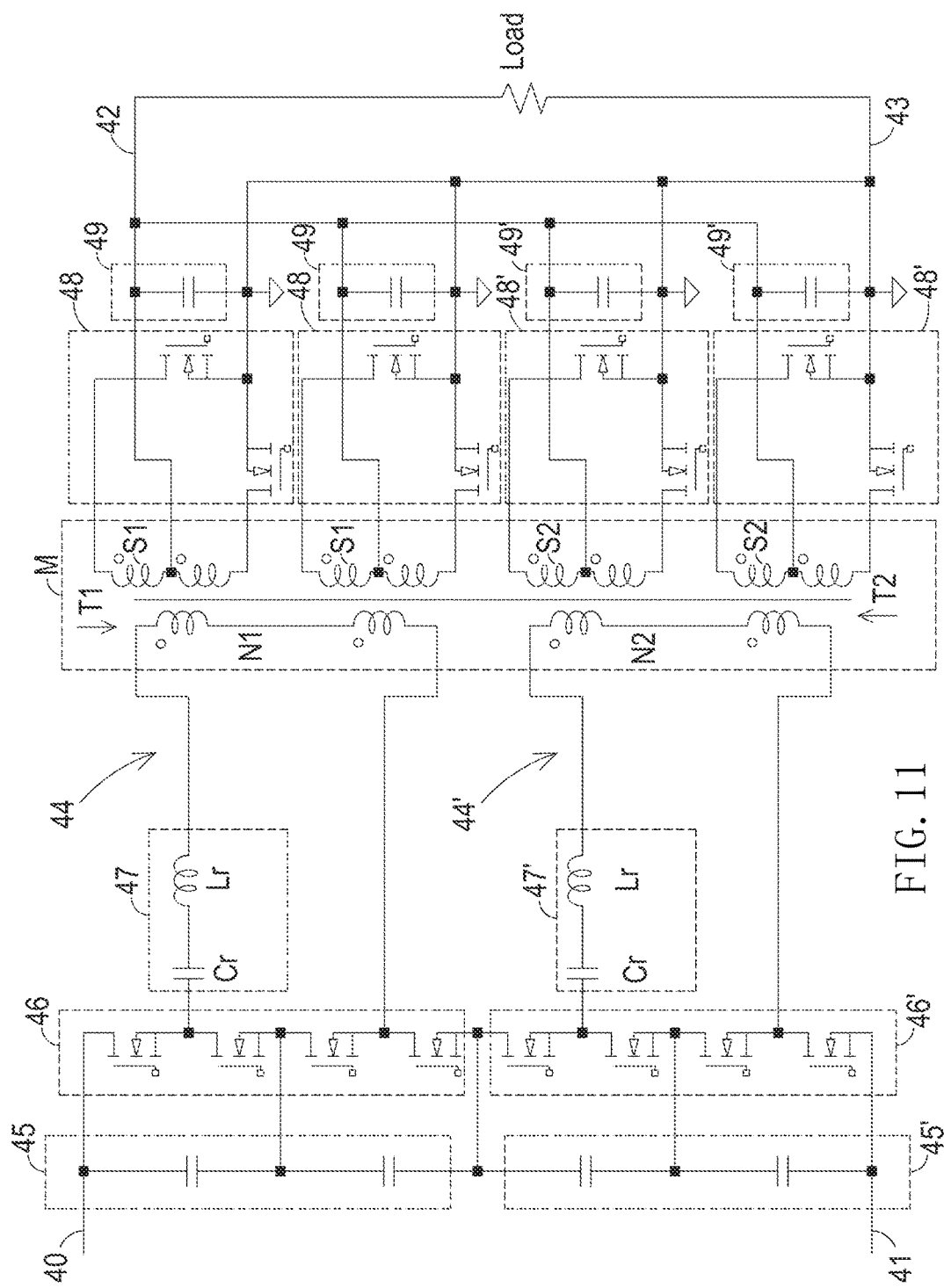
FIG. 11 is a schematic diagram of a circuit structure of a power conversion device in the seventh preferred embodiment of the present invention.

Please refer to FIG. 11, which is a schematic diagram of a circuit structure of a power conversion device in the seventh preferred embodiment of the present invention. As shown in FIG. 11, the circuit architecture of a power conversion device 6 in this embodiment is similar with that of the power conversion device 4 shown in FIG. 6, so same signs are marked to represent similar structure and operation of the circuit, and the details will not be described here. By comparison, the circuit structure of the inverter circuits 46 and 46' of the power conversion device 4 shown in FIG. 6 is a half-bridge circuit architecture consisting of two switch components connected in series, whereas the circuit structure of the inverter circuits 46 and 46' of the power conversion device 6 in this embodiment is a half-bridge three-level circuit architecture consisting of four switch components connected in series.

Figure 12:
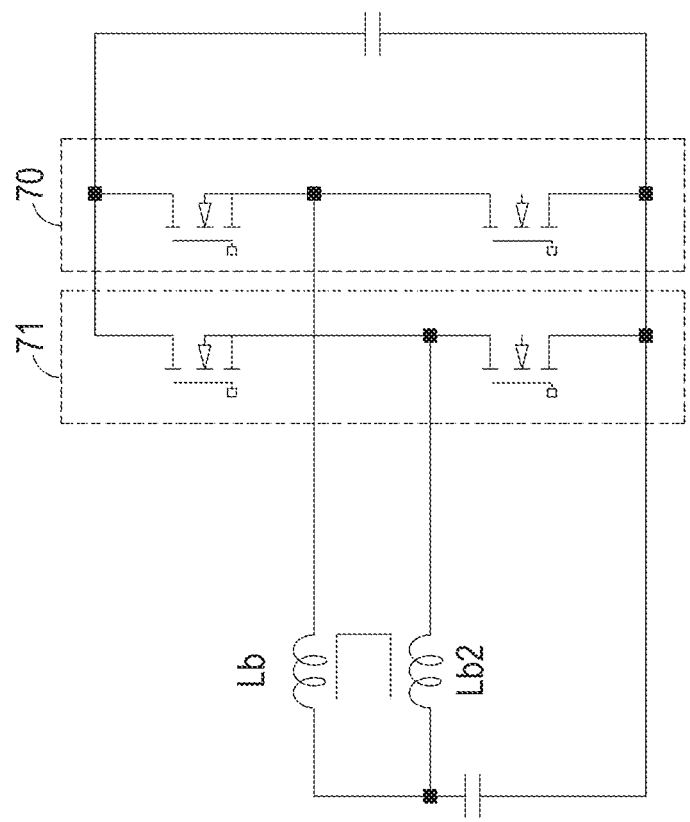
FIG. 12 is a schematic diagram of a circuit structure of a power conversion device in the eighth preferred embodiment of the present invention.

As can be known, the concept of the magnetic component in the present invention can be used to form two magnetic components, such as, forming two transformers, or two inductors. Even further, when the magnetic component forms two inductors with the above concept, the magnetic component consisting of the two inductors may also be applied to other power conversion device. For example, as shown in FIG. 12, when a power conversion device 7 comprises two converting circuits (in order to facilitate explaining, the two converting circuits of the power conversion device 7 are referred as first and second converting circuits in the following partial contents), the first converting circuit comprises a step-up circuit having a step-up inductor Lb, the second converting circuit comprises a step-up circuit having a step-up inductor Lb2, and the two step-up inductors of the two converting circuits may be achieved with the concept of the magnetic component in the present invention. But the architecture of the magnetic component will not be repeated here. In the embodiment shown in FIG. 12, input terminals of the first and second converting circuits are connected in parallel, and the first and second converting circuits may be in phase, or 180° phase shifted.

Figure 13:
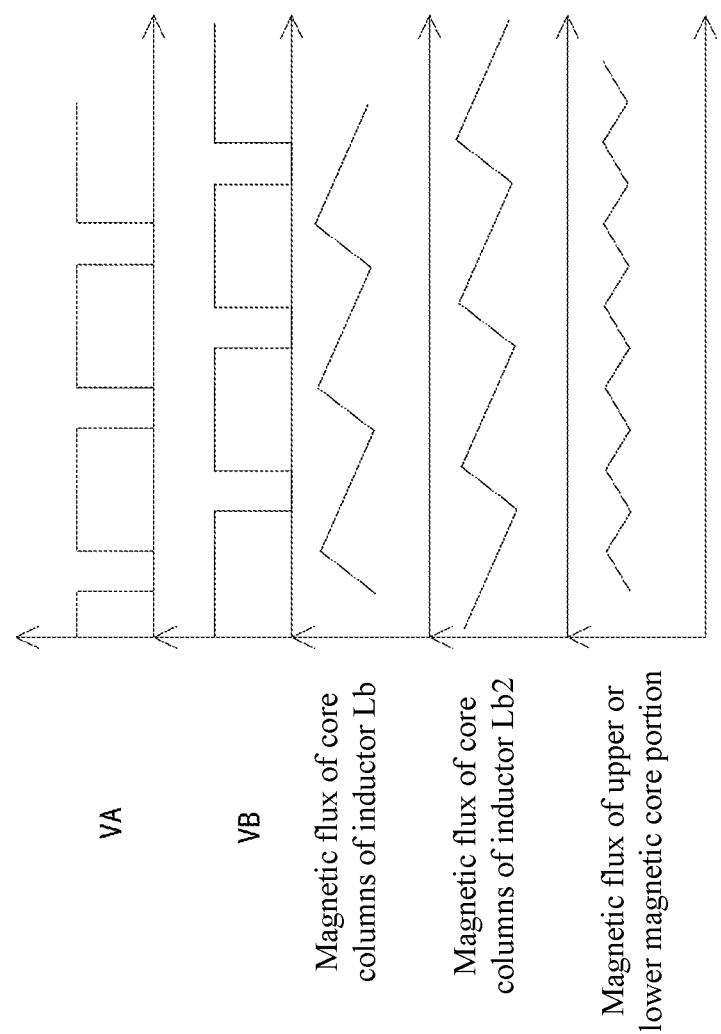
FIG. 13 is schematic diagrams of a waveform at a node where the step-up inductor and the switching circuit of the first converting circuit connect electrically, a waveform at a node where the step-up inductor and the switching circuit of the second converting circuit connect electrically, a flux waveform of the core columns wound by the winding of the step-up inductor of the first converting circuit, a flux waveform of the core columns wound by the winding of the step-up inductor of the second converting circuit, and a flux waveform of magnetic core portions (the upper or lower magnetic core portion) shown in FIG. 12.

In the above embodiment, the first converting circuit comprises the step-up inductor Lb and a half-bridge switching circuit 70, and the second converting circuit comprises the step-up inductor Lb2 and a half-bridge switching circuit 71. One terminal of the step-up inductor Lb of the first converting circuit receives the input electric energy, and the other terminal of the step-up inductor Lb of the first converting circuit is electrically connected to the half-bridge switching circuit 70. One terminal of the step-up inductor Lb2 of the second converting circuit receives the input electric energy, and the other terminal of the step-up inductor Lb2 of the second converting circuit is electrically connected to the half-bridge switching circuit 71. Please further refer to FIG. 13, which is schematic diagrams of a voltage waveform at an a node electrically connecting the step-up inductor Lb and the switching circuit of the first converting circuit, a voltage waveform at a node electrically connecting the step-up inductor Lb2 and the switching circuit of the second converting circuit, a flux waveform of the core columns wound by the winding of the step-up inductor Lb of the first converting circuit, a flux waveform of the core columns wound by the winding of the step-up inductor Lb2 of the second converting circuit, and a flux waveform of magnetic core portions (the upper or lower magnetic core portion) shown in FIG. 12. As can be known from FIG. 13, when the voltage VA at the node electrically connecting the step-up inductor Lb and the switching circuit 70 of the first converting circuit, and the voltage VB at the node electrically connecting the step-up inductor Lb2 and the switching circuit 71 of the second converting circuit are 180° phase shifted, the power conversion device 7 of this embodiment allows a magnetic flux of the core columns wound by the winding of the step-up inductor Lb of the first converting circuit and a magnetic flux of the core columns wound by the winding of the step-up inductor Lb2 of the second converting circuit to be 180° phase shifted. In such way, the magnetic fluxes of the upper and lower magnetic core portions M11 and M12 may be cancelled and reduced, respectively, thereby reducing loss of the magnetic core. In other embodiments, the above first converting circuit may also be changed to comprising a step-down circuit having a step-down inductor, and the second converting circuit may also be changed to comprising a step-down circuit having a step-down inductor.

Figure 14:
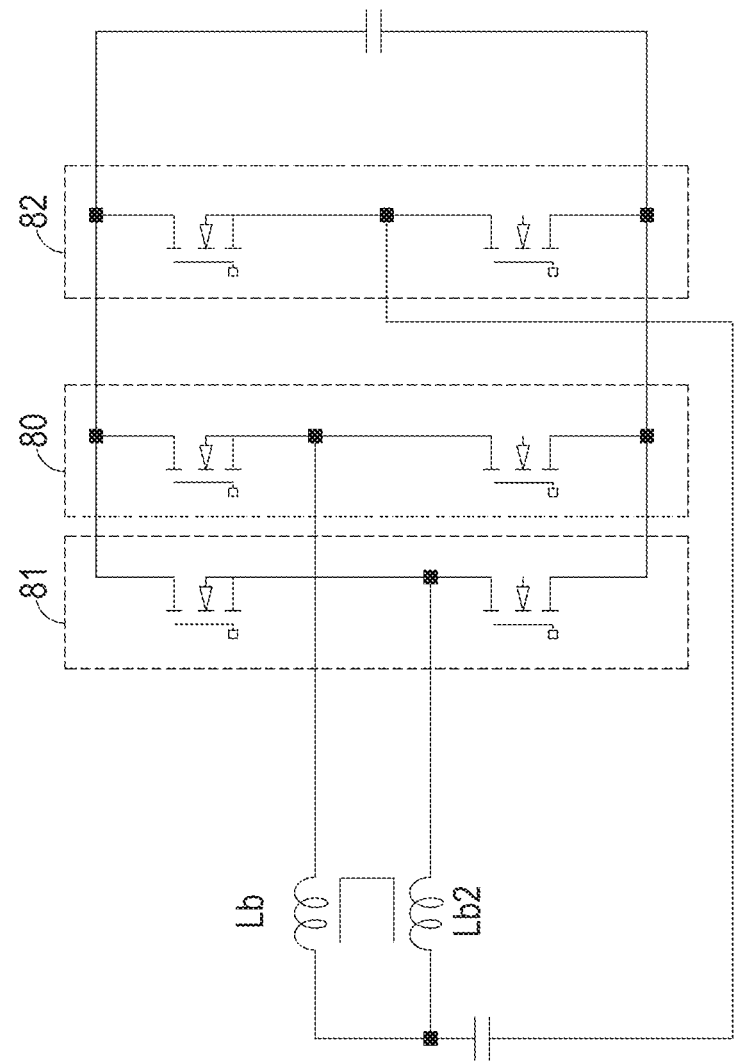
FIG. 14 is a schematic diagram of a circuit structure of a power conversion device in the ninth preferred embodiment of the present invention.

Of course, as shown in FIG. 14, when a power conversion device 8 comprises a first converting circuit and a second converting circuit, the first converting circuit is a Totem pole Power Factor Correction (PFC) circuit architecture having an inductor Lb, and the second converting circuit is also a Totem pole PFC circuit architecture having an inductor Lb2. The inductor Lb of the first converting circuit and the inductor Lb2 of the second converting circuit may also be achieved with the concept of the magnetic component in the present invention, but the architecture of the magnetic component will not be repeated here. In the embodiment shown in FIG. 14, an input terminal of the first converting circuit and an input terminal of the second converting circuit are connected in parallel. Moreover, the first and second converting circuits may further be in phase. But they are not limited thereto, and they may also be 180° phase shifted. In addition, the first converting circuit comprises the inductor Lb, a half-bridge switching circuit 80 and a half-bridge switching circuit 82, and the second converting circuit comprises the inductor Lb2, a half-bridge switching circuit 81 and the half-bridge switching circuit 82.

In conclusion, the present invention provides a magnetic component and a power conversion device using the magnetic component, wherein when performing operation of converting input electric energy into output electric energy, the power conversion device performs using the transformers of the two primary windings connected in parallel in the converting circuits, and the secondary windings of the transformers are connected in parallel at the output terminals through a rectifier bridge. Since the power conversion device of the present invention allows the number of turns of the primary windings of the two transformers to be equal, and the number of turns of the secondary windings of the two transformers also to be equal, and an deviation of inductance between the primary windings connected in parallel is controlled within a range meeting |Lm1−Lm2|/(Lm1+Lm2)<=30%, each of the transformers bears half of the power, and a difference of magnetizing current generated by each transformer and a difference of magnetizing current loss are within a controllable range. In such way, widths and thicknesses of coils of the windings in the two transformers may be controlled within reasonable ranges, so parasitic resistances and thermal resistances of the windings in the two transformers are effectively reduced. Furthermore, since the two core columns cooperating with the upper and lower magnetic core portions in the magnetic component of the present invention actually form a structure similar with a U-core, the magnetic core comprising four core columns may be viewed as a combination of a plurality of U-cores, so when the winding wound around the magnetic component of the present invention is a PCB coil, a foot print size of the PCB coil may be reduced. In addition, since the magnetic component of the present invention may be viewed as a combination of a plurality of U-cores, the heat dissipation effect of the winding on the magnetic component is better. Even further, since the magnetic core of the magnetic component in the present invention may be viewed as a plurality of U-cores sharing the upper and lower magnetic core portions, as compared to using a plurality of independent and uncombined U-cores, sectional areas of the upper and lower magnetic core portions in the present invention increase, and AC fluxes in the upper and lower magnetic core portions decrease, so loss of the upper and lower magnetic core portions may be reduced, and efficiency of the power conversion device in the present invention is improved. Even further, since the AC fluxes on any two adjacent core columns of the magnetic core in the present invention are opposite in direction (or 180° phase shifted), a magnitude of the AC fluxes of the upper and lower magnetic core portions may be further decreased. In such way, loss of the upper and lower magnetic core portions may be further reduced, and efficiency of the power conversion device in the present invention is further improved.

What is claimed is:

1. A power conversion device, characterized in that it comprises:
   at least one resonant circuit comprising at least one resonant inductor and at least one resonant capacitor;
   a first transformer comprising a first primary winding which is electrically connected to the resonant circuit and at least one first secondary winding; and
   a second transformer comprising a second primary winding which is electrically connected to the resonant circuit and at least one second secondary winding, the second primary winding and the first primary winding are connected in parallel and have the same number of coil turns, and the number of coil turns of the second secondary winding is the same as that of the first secondary winding;
   wherein an deviation of inductance between the first primary winding and the second primary winding meets |Lm1−Lm2|/(Lm1+Lm2)<=30%, Lm1 is the inductance of the first primary winding, and Lm2 is the inductance of the second primary winding.

2. The power conversion device according to claim 1, characterized in that the first and second secondary windings are electrically connected to a corresponding rectifying circuit, and are connected in parallel to a load through the corresponding rectifying circuit.

3. The power conversion device according to claim 1, characterized in that the first and second transformers are formed of a first magnetic component, the first magnetic component comprising:
   a first magnetic core comprising a first upper magnetic core portion, a first lower magnetic core portion, and four first core columns which share the first upper and lower magnetic core portions, and are disposed between the first upper and lower magnetic core portions, wherein each of the first core columns is wound by the first secondary winding, or the second secondary winding;
   the first primary winding wound around any two of the four first core columns, such that a first closed magnetic circuit is formed between the two first core columns wound by the first primary winding and the first upper and lower magnetic core portions; and the second primary winding wound around remaining two of the four first core columns, such that a second closed magnetic circuit is formed between the two first core columns wound by the second primary winding and the first upper and lower magnetic core portions;

wherein a sum of an AC flux peak-peak value within the single first core column of the first closed magnetic circuit and an AC flux peak-peak value within the single first core column of the second closed magnetic circuit is larger than an AC flux peak-peak value within the upper magnetic core portion, and is also larger than an AC flux peak-peak value within the lower magnetic core portion.

4. The power conversion device according to claim 1, characterized in that the resonant circuit comprises two resonant inductors, which are a first resonant inductor and a second resonant inductor, and the first resonant inductor and the second resonant inductor are connected in parallel.

5. The power conversion device according to claim 1, characterized in that the resonant circuit comprises two resonant inductors, which are a first resonant inductor and a second resonant inductor, and the first resonant inductor and the second resonant inductor are connected in series indirectly.

6. The power conversion device according to claim 4, characterized in that the first resonant inductor and the second resonant inductor are formed of a second magnetic component, comprising:

a second magnetic core comprising a second upper magnetic core portion, a second lower magnetic core portion, and four second core columns which share the second upper and lower magnetic core portions, and are disposed between the second upper and lower magnetic core portions;

a first winding of the first resonant inductor wound around any two of the four second core columns, such that a third closed magnetic circuit is formed between the two second core columns wound by the first winding and the second upper and lower magnetic core portions; and a second winding of the second resonant inductor wound around remaining two of the four second core columns, such that a fourth closed magnetic circuit is formed between the two second core columns wound by the second winding and the second upper and lower magnetic core portions;

wherein a sum of an AC flux peak-peak value within the single second core column of the third closed magnetic circuit and an AC flux peak-peak value within the single second core column of the fourth closed magnetic circuit is larger than an AC flux peak-peak value within the second upper magnetic core portion, and is also larger than an AC flux peak-peak value within the second lower magnetic core portion.

7. The power conversion device according to claim 5, characterized in that the first resonant inductor and the second resonant inductor are formed of a second magnetic component, comprising:

a second magnetic core comprising a second upper magnetic core portion, a second lower magnetic core portion, and four second core columns which share the second upper and lower magnetic core portions, and are disposed between the second upper and lower magnetic core portions;

a first winding of the first resonant inductor wound around any two of the four second core columns, such that a third closed magnetic circuit is formed between the two second core columns wound by the first winding and the second upper and lower magnetic core portions; and a second winding of the second resonant inductor wound around remaining two of the four second core columns, such that a fourth closed magnetic circuit is formed between the two second core columns wound by the second winding and the second upper and lower magnetic core portions;

wherein a sum of an AC flux peak-peak value within the single second core column of the third closed magnetic circuit and an AC flux peak-peak value within the single second core column of the fourth closed magnetic circuit is larger than an AC flux peak-peak value within the second upper magnetic core portion, and is also larger than an AC flux peak-peak value within the second lower magnetic core portion.

8. The power conversion device according to claim 5, characterized in that the resonant circuit comprises two resonant capacitors, which are a first resonant capacitor and a second resonant capacitor, the first resonant capacitor is connected to the parallel-connected first and second primary windings in series, and the second resonant capacitor is electrically connected between two nodes of the parallel-connected first and second primary windings.

9. The power conversion device according to claim 1, characterized in that each of the core columns is formed of upper columns vertically extending downwards from a first surface of the upper magnetic core portion, and lower columns vertically extending upwards from a second surface which is face to face with the first surface in the lower magnetic core portion, and a position of each of the lower columns corresponds to a position of the upper column.

10. The power conversion device according to claim 1, characterized in that the number of coil turns of the first and second windings after being connected in parallel is an odd number.

11. The power conversion device according to claim 1, characterized in that the power conversion device comprises a converting circuit, which comprises the resonant circuit, the first transformer, the second transformer, and at least one rectifying circuit.

* * * * *